Nov. 3, 1953      R. L. HOLCOMBE      2,657,476
SIGNALING SYSTEM AND DEVICE FOR AIRCRAFT OPERATION
Filed March 20, 1951      3 Sheets-Sheet 1

INVENTOR
Ralph L. Holcombe
BY Russell E. Patterson
ATTORNEY

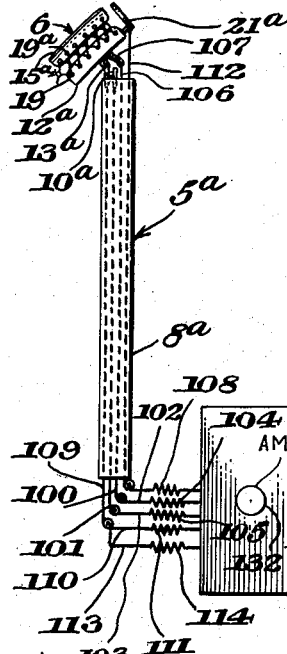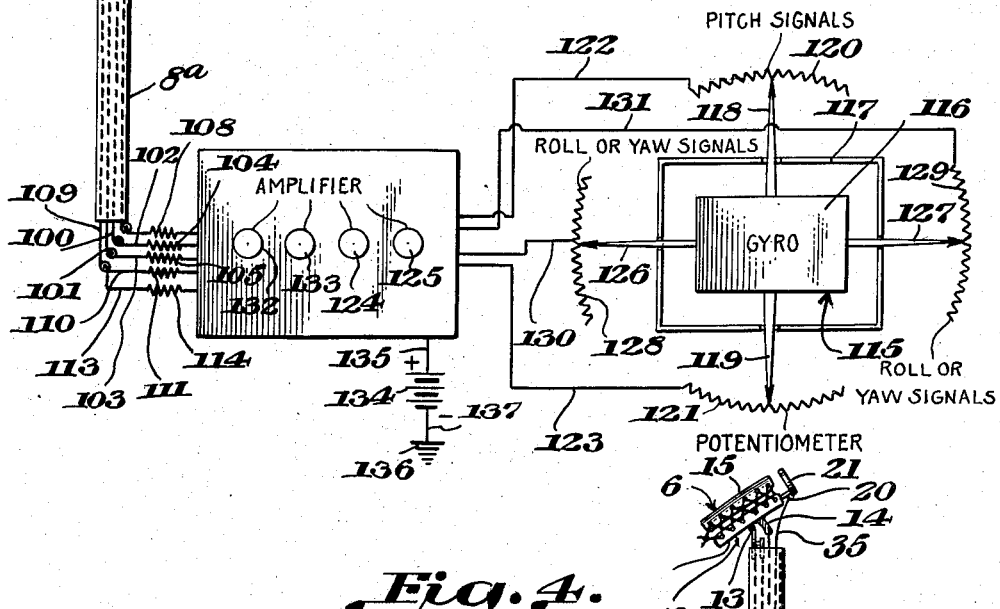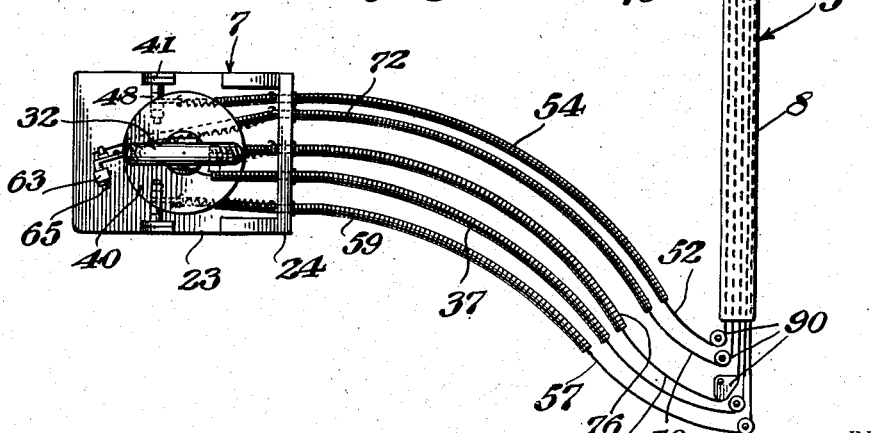

Patented Nov. 3, 1953

2,657,476

UNITED STATES PATENT OFFICE 2,657,476

SIGNALING SYSTEM AND DEVICE FOR AIRCRAFT OPERATION

Ralph L. Holcombe, Ada, Okla., assignor to Trans-Trading Corporation, Washington, D. C.

Application March 20, 1951, Serial No. 216,629

12 Claims. (Cl. 35—12)

The present invention relates to improvements in educational appliances, and more particularly to a signal system for transmitting intelligence or indications from an instructor to a student by tactual kinesthetic channeling of instruction and intelligence so that the student being instructed in the operation of such vehicles and mechanical devices as aircraft, helicopters, traction units and machinery having hand controls may receive instructions through the tactual or feeling senses of one of the body members of the student.

One object is to provide a device of the above-mentioned character in which use is made of the tactual parts of the human body such as the thumb or the like upon which may be imposed various directional pressures to indicate the shifting of a control lever in a corresponding direction and distance equal to the pressure applied to the tactual member of the body.

Another object is to provide an educational device to facilitate the instruction of pilots in the operation of planes, helicopters and other aircraft and to enable the student pilot to obtain the correct sense of manipulation imparted to him through use of tactual motion and pressure from either an instructor pilot or a plane control device of the gyro-type.

Another object is to provide an instruction and teaching device in which various degrees of pressure in two or more directions may be imparted to the cutaneous extroceptors of the hands or feet to indicate a predetermined motion in a certain direction to be applied to a control lever of the aircraft or other device.

Another object is to provide a device of the above-mentioned type which is adapted to be controlled by a pilot instructor such that movements of the aircraft control may be made by the student without the use of visible or audible signals or the like which would tend to confuse the pupil or student in carrying out a predetermined control pattern.

Another object is to provide an instruction device for pupils of vehicles and machinery which includes a housing removably affixed to the pupil's thumb so that when the pupil or student grasps a control lever, he may impart motions to the control lever in the direction and with the predetermined pressure as indicated by the instructor. Thus, the instructor may indicate to a pupil, not only the direction of control lever movement, but also the degree of movement of the control lever by regulating the pressure force exerted on the thumb.

Another object is to provide a device in which the removable thumb cot is urged in a direction by the instructor corresponding to the direction of lever movement desired. That is to say, should the instructor transmit a signal through the senses of the tactual organs in a right direction the pilot's thumb will be moved to the right, thus indicating to the student a corresponding movement of the control lever upon which the student is in control.

Another object is to provide an instruction device for imparting directional signals to a student with various degrees of pressure to indicate the length of stroke of directional movement, while the student has his hand upon the control lever. The control motions with modality can be influenced by the pilot instructor from the instructor's seat of a plane or, from a gyro plane control installed in the aircraft.

Another object is to provide an instruction device including a thumb cot adapted to be applied to the thumb of a student and to pivotally mount the thumb cot on the upper end of a control lever of a plane or other machine for universal movement such that the thumb cot may be moved in opposite directions forwardly and rearwardly as well as laterally, and thus indicate to the student the proper direction of control lever movement and the degree of movement by the degree of pressure exerted on the thumb cot in the predetermined direction.

Other objects and advantages of the invention will become apparent during the course of the following description of the accompanying drawings wherein—

Figure 4 is a diagrammatic view, showing the manner in which the dummy control lever adapted to be actuated by the instructor is connected to the universally mounted finger cot located on the upper end of the control lever of a plane, tractor unit or other piece of machinery in which instructions are to be transmitted to the student operator from an instructor operator.

Figure 6 is a diagrammatic view of a modified form of the invention wherein a gyro stabilizer is employed for transmitting corrective signals to a student pilot through impulses governed by the gyro control.

Figure 1:
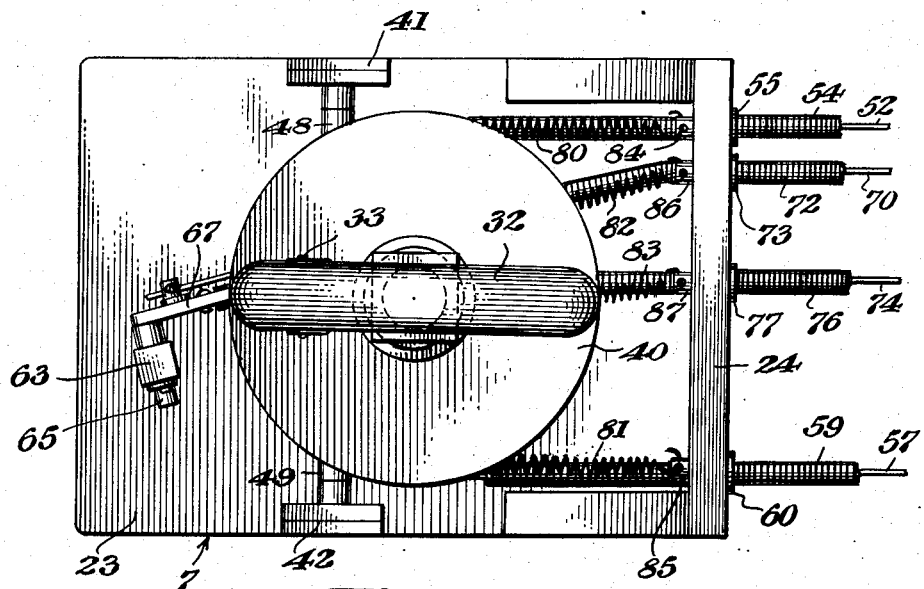
Figure 1 is a top elevational view of a control device which is adapted to be operated by an instructor of an aircraft or machine which can be conveniently placed beside the instructor in order that he can communicate control signals to the student pilot of such aircraft.
Figure 2:
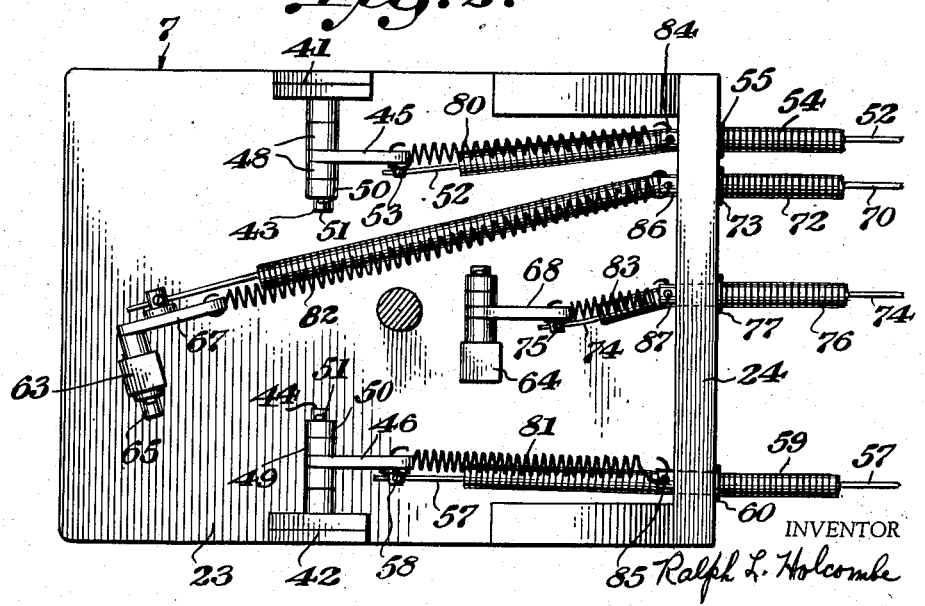
Figure 2 is a view similar to Figure 1, but showing the upper portion of the dummy control lever removed to indicate the various actuating mechanism for the flexible cable controls.

In the drawings, and more in detail, there is shown for the purpose of convenience in illustration in Figures 1 to 5 inclusive, a preferred embodiment of the invention, and attention is first directed to Figure 4, wherein there is shown a control lever generally designated 5 for an aircraft, machine or other device to be controlled. Suitable linkage and the like is associated with the lower end of the control lever (not shown) for operating the various elements of the machine or aircraft. Mounted on the upper end of the control lever 5 is a housing 6, likewise generally designated, for receiving the thumb of a pupil being instructed in the operation of a control lever 5. The instructor's control or actuator is generally designated 7, and includes a dummy lever which is adapted to be controlled by the instructor for imparting corresponding motions to the housing 6.

Figure 5:
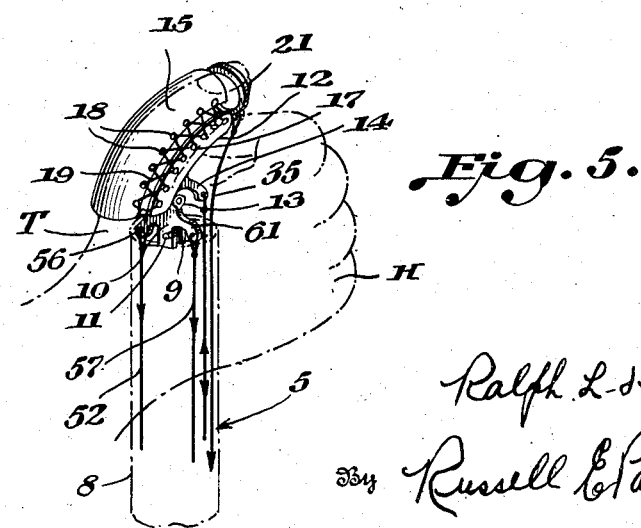
Figure 5 is a perspective view showing the manner in which the thumb cot is universally mounted on the upper end of a control lever of a plane or the like, and illustrating the manner in which the student grasps the control lever with the thumb in position in the cot or housing for receiving directional impulses.

As shown in Figure 5, the control lever 5 includes a tubular shaft 8 on the upper end of which is formed a bracket 9, forming a support for a rocking lever 10. The rocking lever 10 is mounted on the support 9 by means of a pivot pin 11, such that the lever 10 will rock to and fro about said pivot. Pivotally mounted on the lever 10 is the lower section 12 of the thumb cot 6 by means of a pivot pin 13, which passes through a boss in the lever 10 and through an ear in the lower housing section 12. The lower thumb housing section 12 is provided with a curved arm 14, which is integrated therewith and extends downwardly above the tubular control shaft 8. The upper section or housing 15 is shaped to conform to the upper portion of the thumb, and said sections 12 and 15 are provided along their edges with a series of apertures 17 and 18 for receiving a lacing cord 19.

The housing sections 12 and 15 are shaped to conform with the natural contour of the right hand thumb so that the student may place his hand H around the upper portion of the control lever 5, with the thumb T received in the thumb cot 6 and extending above the upper end of the control lever 5. The thumb cot 6 is of a length to permit the extremity of the thumb to protrude a slight distance (Figure 5), and the lower housing section 12 is provided with a slideway (not shown) for slidably receiving an arm 20, on the end of which is provided a thumbtip engaging annulus 21. As shown in Figure 5, the ring or annulus 21 fits about the thumbtip and encircles the thumbnail, so that pressure may be applied to the end of the thumbnail by the instructor to indicate a holding period for a predetermined directional signal.

Figure 3:
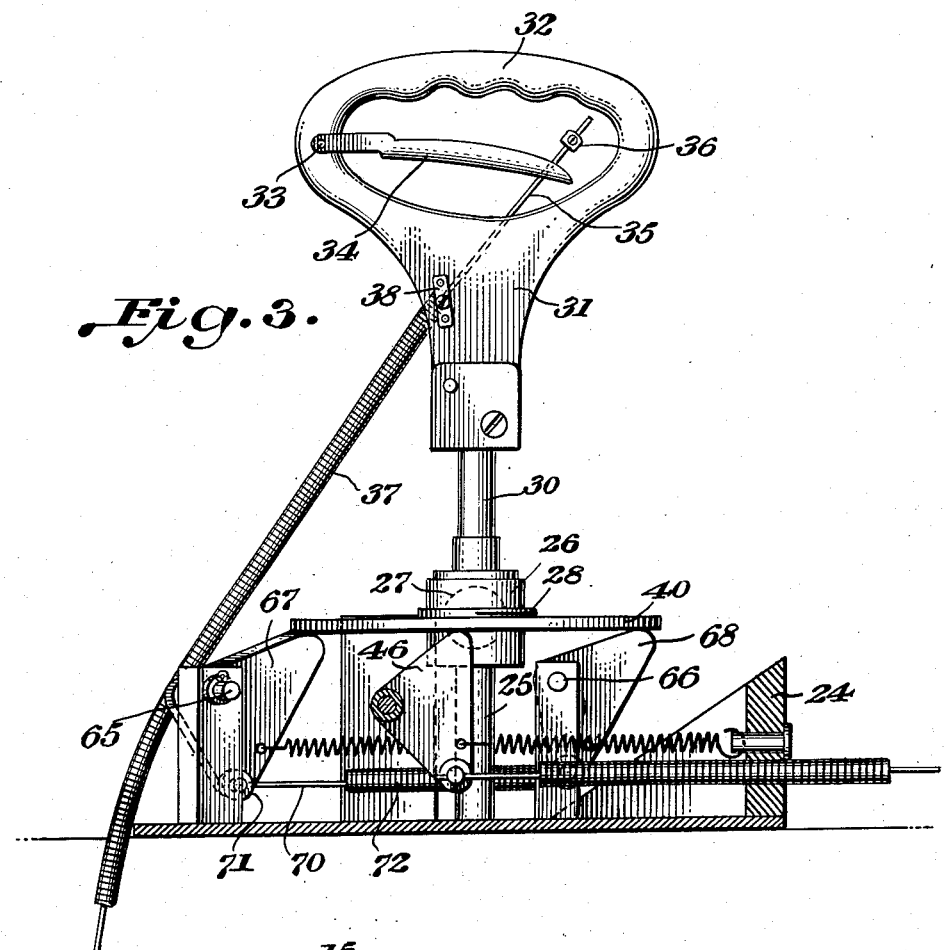
Figure 3 is a side elevational view of the dummy control lever adapted to be operated by an instructor showing portions thereof in section to illustrate various structural details.

The instructor's dummy control lever or transmitter includes a base 23 which may be placed on a seat or the like within convenient reach of a pilot instructor, and said base may be of any desired shape, so that if desired the instructor can place the same on his lap while in a sitting position. An upstanding wall 24 is formed at one end of the base 23, and the central portion is provided with a post 25 having a spherical upper end for receiving a coupling 26 having a correspondingly shaped recess. The spherical end of the post 25 is indicated as at 27, and the coupling 26 may be of the two-part type having complimentary flanges 28 which are held together by screws or the like (not shown). Secured to the universal coupling housing 26 is a dummy control lever 30 on the upper end of which is mounted a handle 31 having a hand grip portion 32. Pivoted to the hand grip portion 32 as at 33 is a hand lever 34 so that the instructor grasps the same with his fingers when transmitting impulse signals to the annulus 21. An opening is formed in the hand lever 34 adjacent the end thereof for receiving a flexible cable 35 having a stop member 36 secured to the end thereof (Figure 3). The flexible cable 35 extends through a sheath 37 which has one end affixed to the handle 31 by means of a clamping plate 38, while the other end extends through the upright wall 24 in the base 23 (Figure 4) and is securely held therein. The other end of the flexible cable 35 is attached to the thumb engaging ring 21 such that when the hand lever 34 is actuated by the instructor, the thumb engaging ring 21 will exert a downward pressure on the thumbnail of the student.

Secured to the universal coupling 26 is a disk 40 which is connected to the flange 28 by screws or the like (not shown) to move with the instructor control lever 30. The radial underface of the disk 40 is disposed over a series of actuating levers as shown in Figures 1 and 3. Adjacent each side of the base 23 is an upstanding bracket 41 and 42 having bearing pins 43 and 44 respectively upon which is mounted triangular-shaped actuator levers 45 and 46. The actuator levers 45 and 46 are provided with hubs 48 and 49, which are held in place by washers 50 and cotter pins 51. The actuator lever 45 is connected to a flexible cable 52 by a swivel connection 53, and said flexible cable extends through a sheath 54 anchored in the upright wall 24 as at 55. The other end of the flexible cable 52 is connected to an arm 56 on the rocking lever 10 as indicated in Figure 5. The actuator lever 46 is connected to a flexible shaft 57 by a swivel connection 58, and said flexible shaft extends through a sheath 59 which is anchored in the upright wall 24 as at 60. The opposite end of the flexible cable 57 is connected to the other arm 61 of the rocking lever 10, as indicated in Figure 5. Thus, when the dummy control handle 32 is moved laterally to right or left, the thumb receiving housing 6 will be rocked about the pivot 11 in a corresponding direction.

In order to transmit forward and rearward impulses to the thumb receiving housing 6, bracket supports 63 and 64 are provided on the base 23 and said bracket supports are provided with openings for receiving shafts 65 and 66. Formed on the end of the shaft 65 is a triangular-shaped actuating lever 67, and supported on the shaft 66 is a triangular-shaped actuator lever 68. The triangular-shaped actuator levers 67 and 68 have their corner ends extending beneath the control disk 40, similar to the triangular-shaped actuator levers 45 and 46. Connected to the actuator lever 67 is a flexible shaft 70 by means of a swivel connection 71, and said shaft extends through a flexible sheath 72 which is anchored in the upright 24 as at 73. Similarly, a flexible cable 74 is attached to the actuator lever 68 by a swivel connection 75 and extends through a flexible sheath 76 which likewise is fastened in place in the upright 24 by a collar 77. The flexible cables 70 and 74 are connected to the lower section 12 of the thumb cot or housing 6 on opposite sides of the pivot pin 13. The flexible cable 70 is attached to an eye 79 rearwardly of the pivot pin 13, while the flexible cable 74 is connected to the arm 14 positioned forwardly of the pivot 13. Thus, when the hand lever 32 is moved forwardly or rearwardly, the thumb cot or housing 6 will be moved in a corresponding direction.

Coil springs 80, 81, 82 and 83 are connected to the actuator levers 45, 46, 67 and 68 respectively, and have their opposite ends connected to the upright wall 24 by their hooked ends being received in transverse openings in retaining plugs 84, 85, 86 and 87 respectively. Thus, the triangular-shaped actuator levers 45, 46, 67 and 68, are yieldingly urged upwardly about their respective pivotal points so that one of the triangular corners will engage the underside of the control disk 40, and when said control disk is shifted forwardly, rearwardly or laterally by actuation of the handle 32 by an instructor, a corresponding direction will be transmitted to the thumb-receiving housing 6. Thus, the student will receive an impulse or pressure on the thumb in a direction corresponding to the direction of instructed movement of the lever 5, and by varying the degree of pressure in said predetermined direction, the instructor can impart to the student the length of such movement. If the instructor desires the student to hold the control in a prescribed position, he actuates the lever 34 to exert pressure on the thumbnail of the thumb T by the thumbnail engaging ring 21.

Thus it will be seen, that the instructor of an aircraft or machine can transmit tactual signals varying in degree for predetermined directions of control lever movement by the pupil without confusing the pupil or distracting from his visual and other duties.

The control cables 52, 57, 70 and 74 extend upwardly through the tubular control lever 8 and pass over a series of guide rollers 90, Figure 4. The tubular control lever 8 could be applied to the upper end of the control stick of an aircraft or, can constitute the control stick itself. In either case, the student grasps the upper end of the control 8 with his thumb clamped between the housing sections 12 and 15 of the cot 6, and when pull forces are exerted on the cables 52, 57, 70 and 74 by moving the lever 32 in a predetermined direction the finger cot 6 will be tilted in a corresponding direction so as to exert a pressure force on the student's thumb of a modality or a degree equal to the pressure applied to the control handle 32.

In the modified form of the invention shown in Figure 6, the control stick 5a is the same as before, and includes a tubular control lever 8a having elevator control linkage associated with the lower end thereof for an aircraft control system (not shown). Pivoted to the upper end of the control lever 5a is a finger cot 6a on a pivotal connection 13a. A rocking lever 10a identical with that shown in Figure 5 is employed to permit lateral rocking movement of the finger cot or thumb housing 6a. The housing 6a is formed of semi-cylindrical sections 12a and 15a shaped to conform to the contour of the student's thumb and the semi-circular sections are provided along their side edges with apertures for receiving lacing 19a.

A pair of cables 100 and 101 extend through the tubular control 8a and are connected to the right and left hand side of the rocking lever 10a in substantially the same manner as the cables 52 and 57 shown in Fig. 5. These cables pass over suitable pulleys and have their ends 102 and 103 respectively connected to the armatures (not shown) of solenoids 104 and 105 respectively. Thus, when the solenoids 104 and 105 are energized alternately the rocking lever 10a will be moved accordingly to tilt the tactual housing 6a to the right or left. Also extending through the lever is a cable 106 which is attached to an arm 107 on the lower casing section 12a located forwardly of the pivotal connection 13a. The cable 106 has its end connected to the armature of a solenoid 108, such that when the solenoid is energized the armature will be attracted to exert a forward rocking movement or pull force on the housing 6a. A fourth cable 109 extends upwardly through the control stick 5a and is attached rearwardly of the pivotal connection 13a similar to the cable 70 (Figure 4). The lower end of the flexible cable 109 is passed over a guide roller and has its end 110 connected to a solenoid 111 and to the armature thereof.

The pressure or holding ring 21a is provided with a flexible cable 112 having its lower end 113 connected to the armature of a solenoid 114, which is in circuit with a source of electrical energy and a manual control switch (not shown) such that an instructor may indicate separate signals. In the form of the invention shown in Figure 6, signals are automatically transmitted to the student for corrective flight purposes. Such corrective signals are adapted to be transmitted to the student pilot of a plane or the like automatically by means of a gyro control device generally designated 115, which includes a casing 116 in which there is housed a gyro device similar to that shown in Patent 2,493,015 issued January 3, 1950, to G. C. Newton and assigned to the Sperry Corporation. Such devices generally control stabilizer motors for actuating the elevators to maintain the plane on a level keel, but in the present device, the gyro control unit 115 is not connected to the elevators and controls of the aircraft. It is intended to use the gyro control unit 115 for imparting corrective signals to a student pilot through tactual impulses on the thumb of the pilot so that he will manipulate the control stick 5a accordingly to maintain the plane in a true horizontal position. In order to accomplish this, the gyro unit 116 is mounted in a frame 117 having arms 118 and 119 which are adapted to engage potentiometers 120 and 121 respectively. The potentiometers 120 and 121 are connected by electrical conductors 122 and 123 respectively to amplifier tubes 124 and 125 of the triode type having a grid, plate and filament. The conductors 122 and 123 are connected to the input leads 124 and 125 or rather to the grids of said tubes 124 and 125.

The frame 117 is provided with laterally extending arms 126 and 127 which are in engagement with potentiometer windings 128 and 129 which have their electrical conductors 130 and 131 connected to the grid or input terminals of amplifier tubes 132 and 133, likewise of the triode type. The filaments of the tubes 124, 125, 132 and 133 are supplied from a direct current 12 volt storage battery 134 which has an electrical cable 135 connected to one side of all of the filaments of the amplifier tubes, while the other terminal of the storage battery is connected to the frame of the plane or ground 136 by an electrical conductor 137.

Plate voltage is supplied to the amplifier triode tubes 124, 125, 132 and 133 by means of a vibrator transformer (not shown) which is likewise energized by the 12 volt storage battery 134, and includes a vibrator reed for alternately energizing the opposite ends of the primary winding of a transformer. The periodic output current is then rectified by a self-rectifying secondary winding, and in its stepped up form the current is supplied to the plate circuit of said tubes. The output or plate voltage of the rectifier tubes are connected to the solenoids 104, 105, 108 and 111, and the other ends of the solenoids are grounded (not shown) to complete the circuit. Thus, when the plane moves off of a horizontal level, with its nose up or down or rolled to the right or left, the resistance in the triode amplifier tubes and in the grid circuit thereof will be changed such as to cause the plate or output voltage from one of the tubes to increase and thereby energize one of the solenoid windings 104, 105, 108 and 111. As this occurs, the opposite signal in a reverse sense is imparted to the thumb housing 6a so that should the plane be nosing down, a force will be exerted on the thumb housing 6a so that the pilot will pull rearwardly on a control stick 5a and thereby move the plane back to its horizontal level.

In operation, let it be assumed that the nose of the plane is above the horizon, and the student pilot is flying the plane with an instructor using a separate set of controls (not shown). As the nose moves above the horizon, the gyro unit 116 will remain in a horizontal position so that the arm 127 will move to the opposite end of the winding 129 from the lead 131, while the arm 126 will move in a direction over the winding 128 toward the connection 130. Thus, more current will flow in the grid circuit of the triode 132 which will energize the winding 104 of the solenoid so that its armature will exert a pull force on the cable 106 and urge the student's thumb forwardly to produce a corresponding push force under the influence of the student on the control stick 5a. Reversely, when the nose of the plane drops below the horizon the arm 126 will move downwardly on the potentiometer winding 128 such that more current will flow in the amplifier tube 133, which has its output connected to the winding of the solenoid 111 such than when said winding is energized a pull force will be exerted on the cable 110 to urge the thumb housing 6a rearwardly about the pivotal connection 13a. The student pilot responds to this impulse by pulling rearwardly on the control stick 5a until the nose of the plane is then level with the horizon and corrective flight is restored. The potentiometer windings 120 and 121 control the output of the tubes 124 and 125 such as to actuate the armatures of the solenoids 104 and 105 and exert pull forces on the cables 102 and 103 to rock the thumb housing 6a laterally in their direction. For instance, should the plane roll to the right a pull force will be exerted on the cable 103 so that the student will respond by moving the control stick 5a to the left.

If the plane rolls to the left the solenoid 104 is energized to actuate the flexible cable 102 and move the thumb housing 6a laterally toward the right so that the pilot will respond by moving the control stick 5a in a corresponding direction. The potentiometer 120 and 121 are arranged vertically while the windings 128 and 129 are likewise arranged vertically and the showing in Figure 6 is simply diagrammatic.

It is to be understood, that the forms of the invention herewith shown and described are to be taken as preferred embodiments thereof and that various changes in the shape, size and arrangement of parts may be resorted to without departing from the spirit of the invention or the scope of the subjoined claims.

I claim:

1. In combination with a control lever adapted to be actuated by a student, a housing rockably mounted on the upper end of the control lever for receiving the thumb of the student when the control lever is grasped adjacent the upper end thereof, flexible cables connected to said housing, and means for actuating said cables to move the housing in a direction corresponding to the direction of an intended control lever movement.

2. In combination with a control lever mounted for movement in opposite directions for controlling a device, a thumb receiving housing rockably mounted on the upper end of said lever adapted to receive the thumb of a student operator when the lever is grasped adjacent the upper end, flexible cables connected to said housing to move the same in a direction corresponding to the direction of control lever movement and means for actuating said cables.

3. In combination with a hollow control lever mounted for movement in at least two directions for controlling a device, a thumb receiving housing rockably mounted on the upper end of said lever to move in the direction of control lever movement and to receive the thumb of a student operator when the lever is grasped at the upper end, flexible cables connected to said housing and extending through said hollow lever and means for actuating said flexible cables to cause the housing to move in a direction of intended control lever movement.

4. In combination with a tubular control lever mounted for movement in at least two directions for controlling an aircraft, a thumb receiving housing mounted on the upper end of said lever for rocking movement in directions corresponding to the direction of lever movement, flexible cables attached to said housing and extending through said tubular lever, and means for actuating said flexible cables to rock said housing in a direction of intended lever movement.

5. In combination with a tubular control lever mounted for movement in at least two directions for controlling the elevators of an aircraft, a thumb receiving housing mounted on the upper end of the lever for rocking movement in directions corresponding to the directions of lever movement and adapted to receive the thumb of a student operator when the lever is grasped in the hand of the operator, flexible cables attached to said housing and extending downwardly through said tubular control lever and means operable by an instructor for exerting a pull force on said cables to move the housing in a direction of intended control lever movement.

6. In combination with a control lever mounted for movement in opposite directions for controlling the elevators of an aircraft, a thumb receiving housing formed of semi-cylindrical sections rockably mounted on the upper end of said control lever and adapted to receive the thumb of a student operator, means for holding said semi-circular sections in clamping engagement with the student's thumb when the upper end of the lever is grasped in the student's hand, control cables connecting said housing and means for actuating said cables under the influence of an instructor.

7. In combination with a tubular control lever for aircraft controls and mounted for movement in opposite directions at right angles to one another, a thumb receiving housing universally mounted on the upper end of said lever for receiving the thumb of a student when the student grasps the upper end of a control lever in his hand, said housing being formed of separable semi-circular sections conforming to the contour of a thumb and adapted to be secured together to grip the student's thumb when the lever is grasped, flexible cables connected to said housing and extending downwardly through said control lever, a dummy control lever adapted to be actuated by an instructor, means for connecting said flexible cables to said dummy control lever whereby movement of said dummy lever will indicate to the student by the rocking movement of the housing the intended direction of control lever movement.

8. In combination with a control lever of an aircraft movable universally for actuating the elevators of an aircraft, a housing universally mounted on the upper end of the control lever for receiving the thumb of a student when the student grasps the control lever adjacent the upper ends of the same, a dummy control lever under the influence of an instructor and flexible cables connecting said dummy lever with the housing to move the housing in a direction of intended control lever movement.

9. In combination with a control lever mounted for movement in at least two directions for controlling a device, a thumb receiving housing mounted on the upper end of the lever for movement in directions corresponding to the directions of lever movement, an annular thumbnail engaging member on said housing, flexible cables attached to said housing, means for actuating said flexible cables to rock said housing in a direction of intended lever movement, a flexible cable connected to said thumbnail engaging member and means for actuating said cable to indicate to a student a predetermined time period for holding the control lever in an instructed position.

10. In combination with a control lever of a vehicle to be controlled, a housing rockably mounted on the upper end of said control lever for receiving the thumb of a student when the control lever is grasped in the hand, flexible cables connected to said housing, solenoids having armatures connected to said cables, a gyro device mounted in the vehicle to be controlled and electronic means operable upon deflections of the vehicle for controlling said solenoids and moving said housing in a direction opposite to vehicle movement.

11. In combination with a control lever for aircraft, a housing universally mounted on the upper end of the control lever for receiving the thumb when the control lever is grasped adjacent its upper end by a student operator, a series of electric solenoids having movable armatures, flexible cables connecting said housing and armatures to move said housing in at least four directions, a gyro control device mounted in the plane, separate electronic control circuits for each of said solenoids, means influenced by said gyro device for rendering said circuits operable independently and a source of electrical energy for each of said separate circuits whereby movement of the plane from a horizon level will cause the housing to be moved in a direction such that the student operator will move the control lever in a direction to correct the deviation from the horizon.

12. In combination with a universally mounted control lever of an aircraft for actuating the elevators thereof, a housing universally mounted on the upper end of the control lever having an opening for receiving the thumb when the control lever is grasped adjacent the upper end by a student pilot, flexible cables extending through said control lever, electric solenoids having movable armatures individually connected to said flexible cables, an electronic circuit for each of said solenoids including a source of electrical energy, a gyro unit universally mounted in the aircraft having arms connected in said electronic circuit, said arms being engageable with potentiometers likewise included in the separate electronic circuits for said solenoids whereby actuation of one of the potentiometers upon movement of the plane from the horizon and in a lateral direction will energize one of the electronic circuits and thereby energize one of the solenoids such that its armature will be actuated and cause a pull force to be exerted on one of the flexible cables to rock the housing in a direction to correct the deviation of the plane from the horizontal.

RALPH L. HOLCOMBE.

References Cited in the file of this patent

UNITED STATES PATENTS

| Number | Name | Date |
|---|---|---|
| 563,578 | Emerson | July 7, 1896 |
| 1,393,456 | Ruggler | Oct. 11, 1921 |
| 1,881,878 | Nidy | Oct. 11, 1932 |
| 2,008,693 | Fator | July 23, 1935 |
| 2,060,806 | Hunt | Nov. 17, 1936 |
| 2,190,390 | Thiry | Feb. 13, 1940 |
| 2,351,977 | Kronenberger | June 20, 1944 |
| 2,493,015 | Newton | Jan. 3, 1950 |
| 2,510,161 | Wilkinson | June 6, 1950 |

FOREIGN PATENTS

| Number | Country | Date |
|---|---|---|
| 127,820 | Great Britain | June 2, 1919 |
| 310,264 | Germany | Jan. 4, 1919 |
| 352,070 | Germany | Apr. 22, 1922 |
| 378,172 | Great Britain | Aug. 11, 1932 |
| 396,540 | Great Britain | Aug. 10, 1933 |